UNITED STATES PATENT OFFICE.

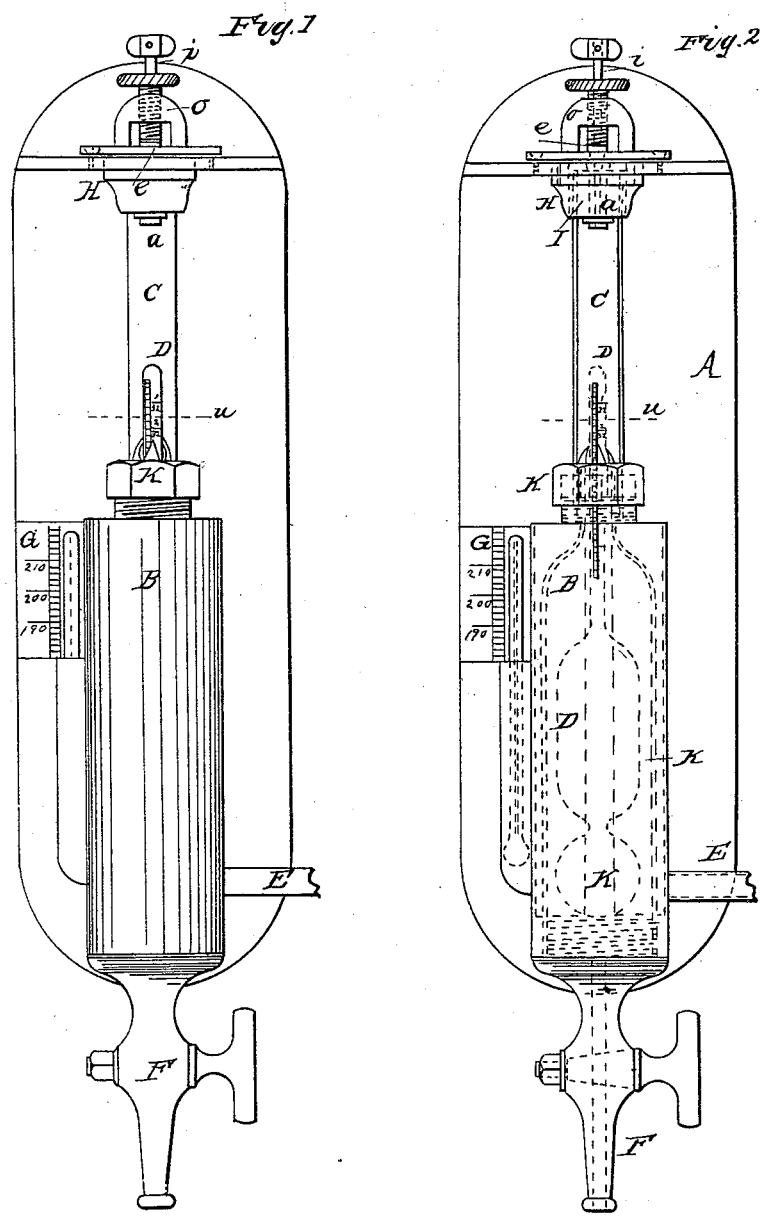

BENJAMIN F. BEE, OF HARWICH, MASSACHUSETTS.

IMPROVEMENT IN SALINOMETERS.

Specification forming part of Letters Patent No. 51,912, dated January 9, 1866.

*To all whom it may concern:*

Be it known that I, BENJAMIN F. BEE, of Harwich, in the county of Barnstable, in the State of Massachusetts, have invented a new and Improved Salinometer-Case, to be used in testing the density of the water in marine boilers; and I do hereby declare that the following is a full, clear, and exact description of the construction and operation of the same, reference being had to the annexed drawings, making a part of this specification, in which—

Figure 1 is a front elevation, and Fig. 2 a vertical section.

A in the figures is a piece of metal, serving as a bed-piece, to which is attached the several parts of the apparatus. It should be of such thickness and rigidity as not to bend or spring easily, in order to preserve the glass tube C from liability to leakage or fracture.

B is a metallic cylinder, of sufficient capacity to contain the salinometer-glass D, in common use, and of sufficient strength to resist the pressure employed in the boiler to which it may be attached.

E is the pipe for conducting the water to be tested from the boiler to the cylinder B.

F is the outlet or waste cock for regulating the flow of water to the cylinder and for discharging the same.

G is a thermometer, the bulb of which is in communication with the water in the cylinder, and indicates the temperature of the water tested.

H is a case containing a block of vulcanized rubber, I. This rubber is penetrated about three-fourths of its depth by an annular groove for receiving the upper end of the glass tube. The rubber I is also penetrated at the center by the small tube $a$, at the top of which is a small conical valve, $e$, for regulating and preventing the escape of the air from the glass tube and cylinder. As it is necessary that the valve $e$ should close perfectly tight it is so constructed as to be readily reground or cleared in case of any leakage or obstruction. For this purpose the valve-stem $i$ may revolve freely without progressing in either direction, and is opened and closed by the screw-sleeve $o$.

K is a light frame-work, serving as a guide for keeping the salinometer-glass in an upright position. It terminates at the top in several small points, to lessen the friction and allow the glass to slide freely between them.

The nature of this invention consists in placing the salinometer-glass, used in testing the density or saturation of the water in marine boilers, with the water to be tested, in a closed vessel, where they are subject to the boiler-pressure, and providing the means by which the surface of the water may be brought in sight, for the purpose of ascertaining the point at which the salinometer-glass will float therein.

The construction of the apparatus is made sufficiently plain by the foregoing description of the figures in the drawings.

The operation is as follows: Commencing with the glass tube C and cylinder B free of water and filled with atmospheric air at its ordinary pressure, close the waste-cock F. When this is done allow the water from the boiler to flow into the cylinder through E. A cock is usually attached to marine boilers for this purpose. The air contained in the cylinder will be compressed into the tube C and upper portion of the cylinder, according to the pressure in the boiler; but the quantity of air contained in the cylinder will not be sufficiently compressed by the pressure usually carried in marine boilers to allow the water to appear in the glass tube. Now, open the valve $e$ and allow just such quantity of air to escape that the water will rise to about $u$. The salinometer-glass, already contained in the cylinder, will rise with the water and remain suspended at a point according to its saturation and temperature. At the first filling of the cylinder the water will not retain the temperature at which the salinometers are usually graduated, but by opening the waste-cock and allowing the water to escape slowly (the communication with the boiler remaining open) it may be brought to any temperature desired. If it is desirable that the indication of the saturation should be constant, nothing more is necessary than to adjust the waste at F so that the temperature shall be constant.

If by any means the air in the glass tube escapes it may be recharged by repeating the process, as at starting.

The advantages of this apparatus over others used for the same purpose (some of which are denominated "constant") are that by testing the water under pressure I avoid all the nuisance of escaping steam, the liability to scalding, and any manipulating of the salinometers and thermometers, by which great quantities of those articles are constantly being broken. For the same reason the apparatus may be placed at a greater distance from the boiler than the open case, and a very slight overflow only is necessary to maintain the temperature.

What I claim as my invention, and desire to secure by Letters Patent, is—

1. The combination of the closed vessel for containing the water to be tested and the instrument for testing it, the same being subject to the boiler-pressure.

2. The arrangement for adjusting and retaining the water-line in sight by the compression of the air contained in the cylinder B and tube C.

3. The arrangement of the valve $e$ and its appendages, when used for the purpose as set forth.

BENJAMIN F. BEE.

Witnesses:
OBED BROOKS,
GEO. H. SNOW.